United States Patent [19]
Mishra

[11] Patent Number: 5,902,342
[45] Date of Patent: May 11, 1999

[54] DETECTION OF VIBRATION IN AN AC TRACTION SYSTEM

[75] Inventor: Ajay P. Mishra, Cannonsburg Township, Washington County, Pa.

[73] Assignee: ABB Daimler-Benz Transportation (North America) Inc., Pittsburgh, Pa.

[21] Appl. No.: 08/829,328

[22] Filed: Mar. 27, 1997

[51] Int. Cl.$^6$ .................................. G06G 7/76; G06F 7/70
[52] U.S. Cl. .................... 701/22; 180/65.2; 180/65.4; 318/632; 246/187 A
[58] Field of Search ................................ 701/36, 22, 56; 180/65.2, 65.3, 65.4, 165, 197; 246/187 A, 182 R; 318/274, 375, 632, 432, 629, 67, 85

[56] References Cited

U.S. PATENT DOCUMENTS

| | | | |
|---|---|---|---|
| 3,970,160 | 7/1976 | Nowick | 180/65.2 |
| 4,401,974 | 8/1983 | Jarrett et al. | 180/179 |
| 4,701,682 | 10/1987 | Hirotsu et al. | 180/197 |
| 5,349,278 | 9/1994 | Wedeen | 318/632 |
| 5,492,192 | 2/1996 | Brooks et al. | 701/22 |
| 5,635,805 | 6/1997 | Ibaraki et al. | 180/65.4 |
| 5,697,466 | 12/1997 | Moroto et al. | 180/65.8 |
| 5,713,541 | 2/1998 | Schmitz et al. | 246/187 A |
| 5,722,502 | 3/1998 | Kubo | 180/65.4 |

*Primary Examiner*—Jacquese H. Louis-Jacques
*Attorney, Agent, or Firm*—Webb Ziesenheim Bruening Logsdon Orkin & Hanson, P.C.

[57] ABSTRACT

An electric powered vehicle includes a traction motor powered from a source of switched DC power. The motor includes a tachometer for measuring the rotational velocity of the motor and for providing a tachometer signal indicative thereof. A low pass filter low pass filters the tachometer signal and produces a reference tachometer signal. A summing circuit combines the tachometer signal and the reference tachometer signal to produce a deviation signal. The deviation signal is provided to a signal processing circuit which includes a comparator and a reference value generator. The comparator compares the output of the summing circuit to a reference value provided by the reference value generator and produces a binary changing signal as a function of the comparison. A controller, which controls the rate DC power is switched to the motor, accumulates a count of the comparator signals over a predetermined interval and terminates the provisioning of power to the motor if the accumulated count exceeds a predetermined value.

23 Claims, 6 Drawing Sheets

DETECTION OF VIBRATION IN AN AC TRACTION SYSTEM

BACKGROUND OF THE INVENTION

1. Field of the Invention

The present invention relates to the detection of vibration in an electric powered vehicle and more specifically to the detection of vibration in an electric powered vehicle having traction motors powered from a source of switched DC power.

2. Description of the Prior Art

Mass transit vehicles are often utilized to transport passengers along fixed routes. High voltage DC electric power is often provided to such vehicles via an electric line or an energized rail that traverses the fixed path. Electrical energy from the electric line or the third rail is brought into the vehicle via a pantograph or a brush assembly.

Such vehicles often include AC traction motors for imparting motive force to the wheels of the vehicle. One or more inverters are positioned between the incoming high voltage DC and the AC traction motors. The inverters transform the high voltage DC power into a switched DC power. The switched DC power synthesizes a three-phase sinusoidal waveform which is fed to the AC traction motors. The AC traction motors convert the switched DC power into rotational motion that is utilized to impart motive force to wheels of the vehicle.

A typical inverter includes six power switching devices that are controllably switched ON/OFF to synthesize the three-phase waveform supplied to the AC motors. If all six power switching devices are operating properly, motive power is delivered uniformly to the wheels. In response to the uniform delivery of power to the wheels, passengers transported in the vehicles experience relatively smooth acceleration and operation. If, however, one of the six power switching devices is not switching properly the output of the inverter is not a three-phase sinusoidal waveform.

In the absence of receiving a three-phase sinusoidal waveform, the AC traction motor delivers power non-uniformly to the wheels of the vehicle. This non-uniform delivery of power is detected as vibration in the vehicle. This vibration is more pronounced during acceleration of the vehicle and at speeds less than 30 miles per hour. Above 30 miles per hour the rotational inertia of the motor and the linear inertia of the vehicle tend to dampen the vibrations caused in the absence of one of the power switching devices not operating.

It is an object of the present invention to provide a method and apparatus for the detection of the presence of vibration in a vehicle caused by the non-operation of one of the power switching devices in the inverter. It is a further object of the present invention to take suitable corrective action to reduce or eliminate the vibration caused by the non-operation of one of the power switching devices.

SUMMARY OF THE INVENTION

Accordingly, I have invented a method and an apparatus for detecting and reducing vibrations in an electric powered vehicle.

In one method, switched DC power is provided to a motor which is coupled to wheels of a vehicle to provide motive force thereto. A tachometer signal is produced indicative of the rotational velocity of the motor. Deviations between the tachometer signal and a reference tachometer signal are detected and an output signal is generated that changes binary state as a function of the detected deviations. A count of one of the binary states of the output signal over a preselected interval is accumulated in a first counter and the supply of switched DC power to the motor is controlled as a function of the accumulated count. The reference tachometer signal is preferably obtained by low pass filtering of the tachometer signal.

In one embodiment, the detected deviations are compared to a reference value and the output is in one of the binary state when a detected deviation is greater than the reference value and is in the other binary state when the detected deviation is less than the reference value. Alternatively, the detected deviations are compared to a positive value and a negative value and the output signal is in one of the binary states when the detected deviation is between the positive value and the negative value and is in the other binary states when the detected deviation is one of greater than the positive value and less than the negative value.

In another embodiment, the detected deviations are differentiated. The differentiated deviations are compared to a value and the output signal is generated as a function of the differentiated deviations.

In yet another embodiment, a second counter is incremented when the accumulated count of the first counter is greater than a first number. The value of the second counter is compared to a second number and the supply of switched DC power to the motor is terminated when the value of the second counter is greater than the second number.

In another method, switched DC power is provided to a motor and the rotational velocity of the motor is detected. A tachometer signal is produced indicative of the rotational velocity of the motor and a reference signal tachometer is generated. The deviation between the tachometer signal and the reference tachometer signal is determined and compared to a reference value. A count is accumulated as a function of the comparison and the provisioning of switched DC power to the motor is controlled as a function of the accumulated count.

In an apparatus in accordance with an embodiment of the present invention, a filter is provided for filtering a tachometer signal and for outputting a reference tachometer signal. A combiner combines the tachometer signal and the reference tachometer signal and outputs a deviation signal. A signal processing circuit outputs a comparator signal which is functionally related to the deviation signal. A controller accumulates in a first counter a count of comparator signals having a value that is one of greater than and less than a first value and which causes a motor drive circuit to control the provisioning of power to a motor as a function of the accumulated count. The signal processing circuit includes a differentiator and a comparator. The differentiator differentiates the deviation signal and outputs a differentiated deviation signal. The comparator compares the differentiated deviation signal to a second value and outputs the comparator signal which is functionally related to the comparison. The comparator signal is preferably a binary signal that is in one binary state in response to the deviation signal being greater than the first value, and is in the other binary state in response to the deviation signal being less than the first value.

In another embodiment, the vehicle has a plurality of wheels and a motor which imparts motive force to the plurality of wheels. A converter is connected between a source of DC power and the motor and a controller controls the operation of the converter to deliver switched DC power to the motor. A tachometer measures the rotational velocity of the motor and outputs a tachometer signal related to the rotational velocity. A filter filters the tachometer signal and outputs a reference tachometer signal which is combined by a combiner with the tachometer signal to produce a deviation signal. A signal processing circuit outputs a comparator signal that changes binary state as a function of the deviation signal. The controller accumulates in a first counter, and over a select interval of time, a count of one of the binary states of the comparator signal. The controller causes the converter to terminate delivering switched DC power to the motor as a function of the accumulated count. The signal processing circuit includes a comparator which compares the deviation signal to a first value and which outputs a comparator signal in one of the binary states as a function of the comparison.

An advantage of the present invention is that vibration caused in a vehicle by the non-operation of a power switching device can be detected in the output signal of the tachometer by measuring the rotational velocity of the motor. Still other advantages will become apparent upon reading and understanding the following detailed description.

DETAILED DESCRIPTION OF THE PREFERRED EMBODIMENTS

Figure 1:
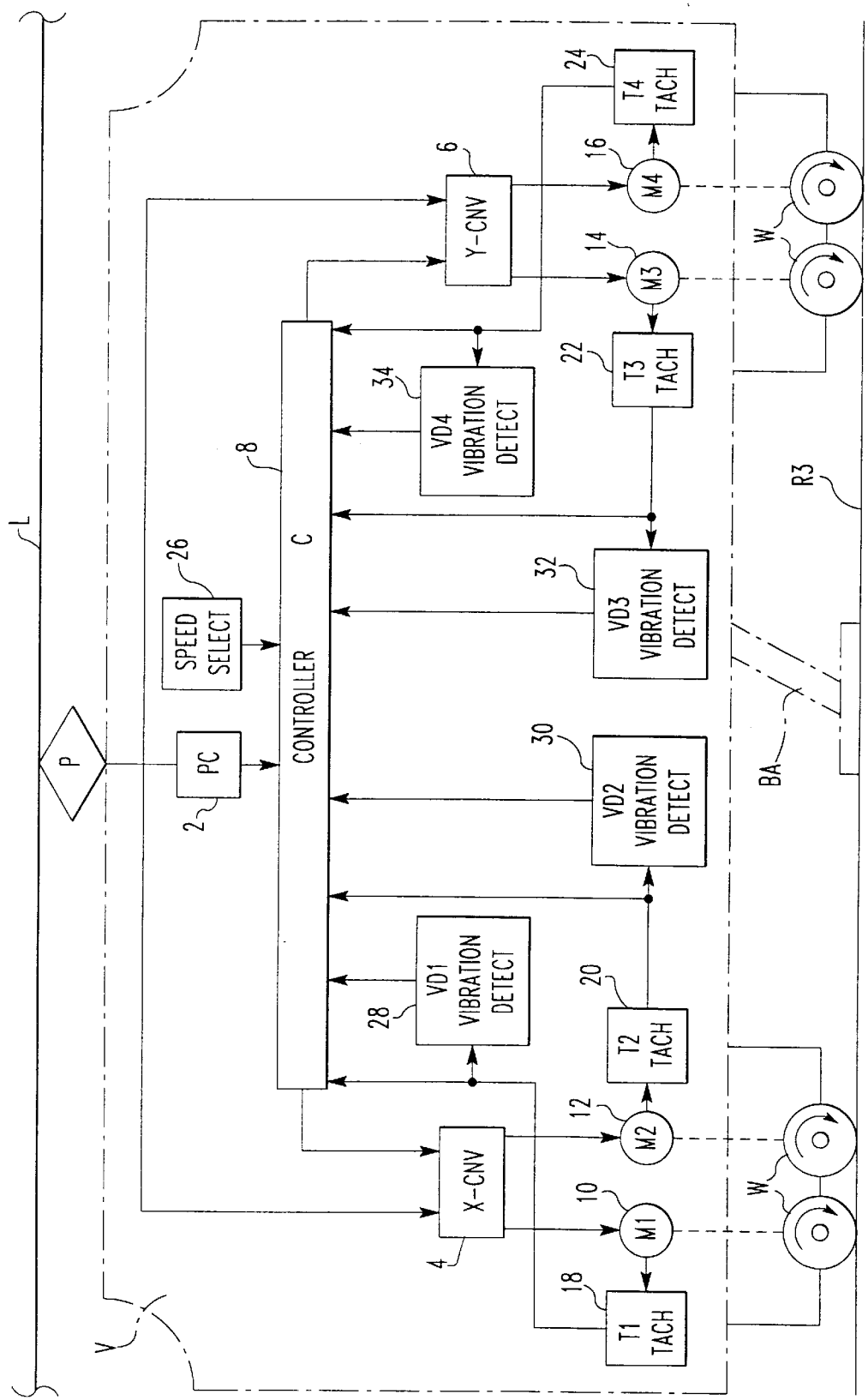
FIG. 1 is a diagrammatic illustration of a vehicle including circuitry for controlling the delivery of switched DC power to motors of the vehicles and circuitry for detecting vibration in the vehicle caused by the delivery of switched DC power to the motors.

With reference to FIG. 1, an electric powered vehicle V, such as a light rail vehicle, is connected to an electric line L, such as an overhead line, via, for example, a pantograph P. The electric line L provides a medium for the delivery of high voltage DC electric power to the vehicle V from a remote source (not shown). Alternatively, high voltage DC electric power can be delivered to the vehicle V via a third rail R3 and picked up at the vehicle V by, for example, a brush assembly BA (shown in phantom).

DC electric power delivered to the vehicle V is provided to a power converter PC 2, an X converter X-CNV 4 and a Y converter Y-CNV 6. The power converter 2 drops the supplied high voltage DC electric power to a voltage level useable by a controller C 8. The controller 8 includes internal elements, such as, without limitation, a microprocessor, logic and control circuitry and a memory unit that includes, for example, RAM, ROM, EPROM, magnetic mass storage units or the like as required.

The X converter 4 and the Y converter 6 are motor driver circuits utilized to controllably provide or supply switched DC power to motors M1–M4 10–16. More specifically, the X converter 4 and the Y converter 6 are connected to receive control signals from the controller 8. The controller 8 supplies the control signals to the X converter 4 and the Y converter 6 which respond to such control signals by controllably converting the supplied high voltage DC into switched DC electric power useable by the motors 10–16. In response to the supply of switched DC electric power, the motors 10–16 impart motive force to wheels W of the vehicle V.

Tachometers T1–T4 18–24 are connected to respective motors 10–16 to measure the rotational velocity, or rpms, of the motors. Each of the tachometers 18–24 produces a tachometer signal that is indicative of the rotational velocity of its corresponding motor 10–16. The tachometer signals are provided to the controller 8 which utilizes the tachometer signals in a feedback mode to control the supply of control signals to the X converter 4 and to the Y converter 6 based on a desired speed of the vehicle V established at an input of controller 8 by a speed select SS 26.

Connected in parallel between the output of tachometers 18–24 and the inputs of the controller 8 are vibration detect circuits VD1–VD4 28–34, respectively. The vibration detect circuits 28–34 detect the presence of vibration in the vehicle V caused by an improperly operating converter. More specifically, the vibration detect circuits 28–34 receive the tachometer signals from tachometers 18–24 and convert these signals into comparator signals indicative of vibration in the vehicle V caused by the operation of motors 10–16, respectively. The comparator signals from vibration detect circuits 28–34 are provided to the controller 8 which analyzes these signals and determines whether motors 10–16 are operating properly or are causing excessive vibration in the vehicle V. In response to determining that a motor 10–16 is causing excessive vibration, the controller 8 discontinues supplying control signals to the associated X converter 4 or Y converter 6. The vehicle V is then operated from the operational one of the converters 4 or 6 supplying switched DC power to its corresponding motors.

Figure 2:
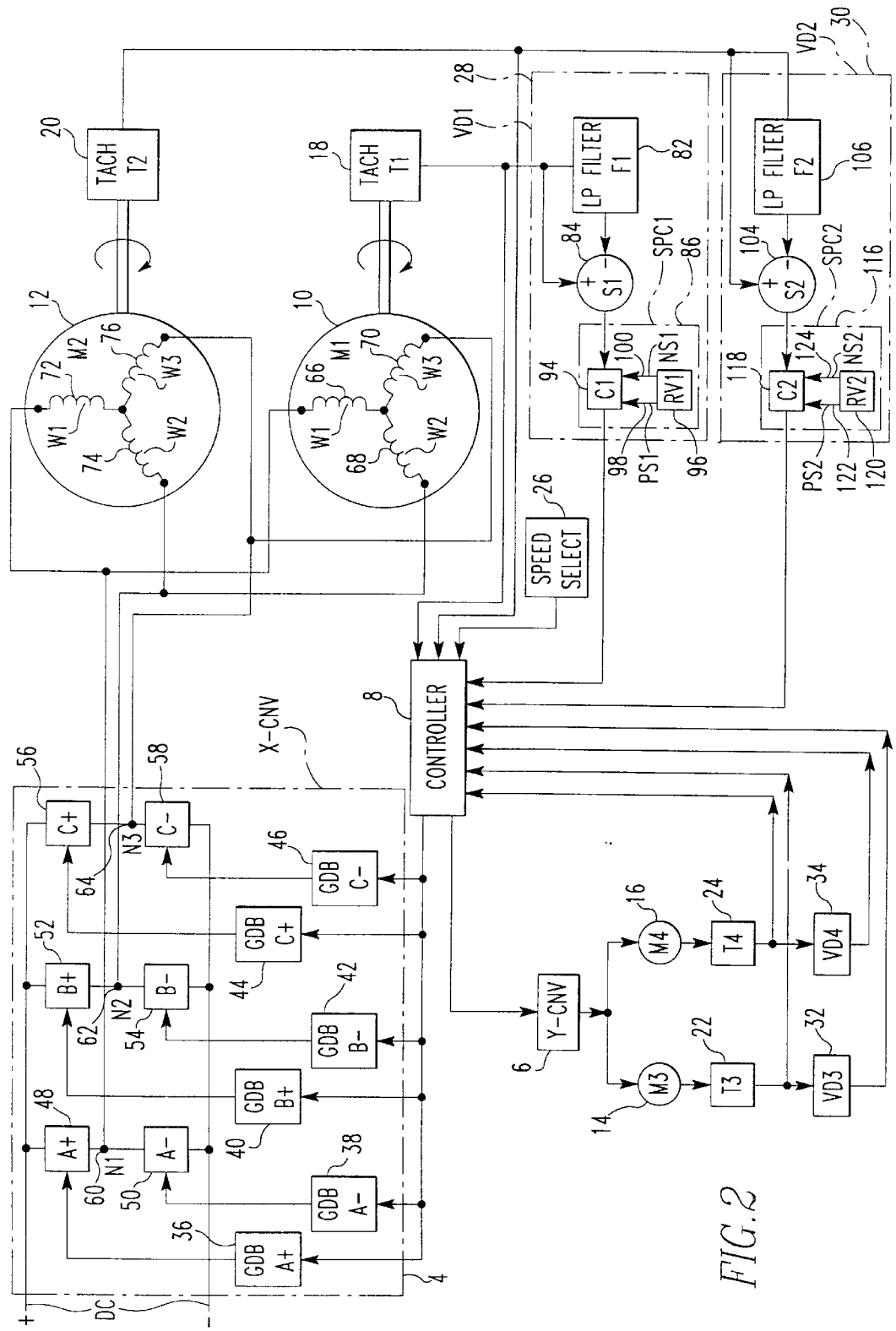
FIG. 2 is a more detailed diagrammatic illustration of a portion of the circuitry in FIG. 1.

With reference to FIG. 2 and with continuing reference to FIG. 1, the X converter 4 and the Y converter 6 are similarly constructed and connected between the controller 8 and their respective motors. To avoid redundancy, only the operation of the X converter 4 powering motors 10 and 12 will be described herein. The X converter 4 includes gate driver boards GDB_A+ 36, GDB_A– 38, GDB_B+ 40, GDB_B– 42, GDB_C+ 44 and GDB_C– 46 connected between outputs of the controller 8 and inputs of power switching devices A+ 48, A– 50, B+ 52, B– 54, C+ 56 and C– 58, respectively. The gate driver boards provide signal conditioning between the outputs of the controller 8 and the inputs of the power switching devices 48–58. The power switching devices 48–58 are transistors or other controllable switching devices as are known in the art. The power switching devices 48–58 are connected in series and in pairs between the plus (+) and minus (–) terminals of the incoming high voltage DC electric power. For example, the A+ power switching device 48 and the A– power switching device 50 are series connected between the plus (+) side and minus (–) side of the incoming DC electric power, respectively.

Nodes N1 60, N2 62 and N3 64 formed between the series connected power switching devices 48:50, 52:54, and 56:58 are connected to windings W1 66, W2 68 and W3 70 of Y connected motor 10 and windings W1 72, W2 74 and W3 76 of Y connected motor 12. The motors 10 and 12 each have a stationary stator and a rotatable rotor. The tachometers 18 and 20 are connected to measure the rotational velocity of the rotors of the motors 10 and 12. The tachometers 18 and 20 convert the rotational velocity of the rotors into tachometer signals indicative of the rotational velocity of the motors 10 and 12.

The controller 8 controls the operation of the X converter 4 so that the gate driver boards 36–46 and the power switching devices 48–58 synthesize a three-phase sinusoidal waveform which is supplied to the windings 66–70 of motor 10. In response to receiving the synthesized three-phase sinusoidal waveform, the motor 10 uniformly delivers power to the wheels associated therewith.

Figure 3:
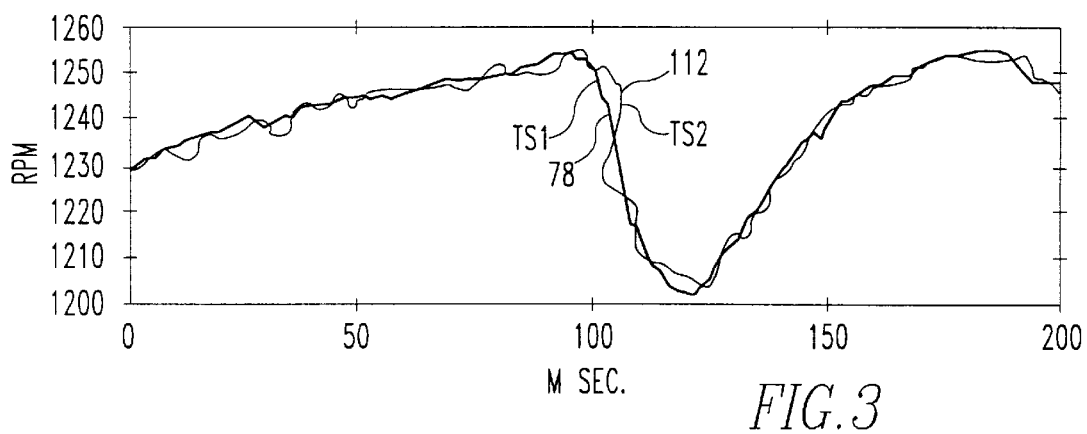
FIG. 3 is a graphical illustration of tachometer signals output by tachometers T1 and T2 measuring the rotational velocity of motors M1 and M2 in FIG. 1 being driven from X converter X-CNV having all of its power switching devices operating.

With reference to FIG. 3 and with continuing reference to FIG. 2, the uniform delivery of power to motor 10 is translated into, inter alia, smooth acceleration of the vehicle V and is detectable by monitoring the output of the associated tachometer 18. In response to rotation of the rotor of motor 10, the tachometer 18 outputs a substantially noise free tachometer signal TS1 78 indicative of the rotational velocity or rpm of the motor 10. In operation, the tachometer signal 78 has some noise components superimposed thereon which are believed to be attributable to, without limitation, the operating frequency of the X converter 4. These noise components, however, are typically of acceptable levels so that the vehicle V undergoes smooth acceleration and the tachometer signal 78 can be considered substantially noise free.

Figure 4:
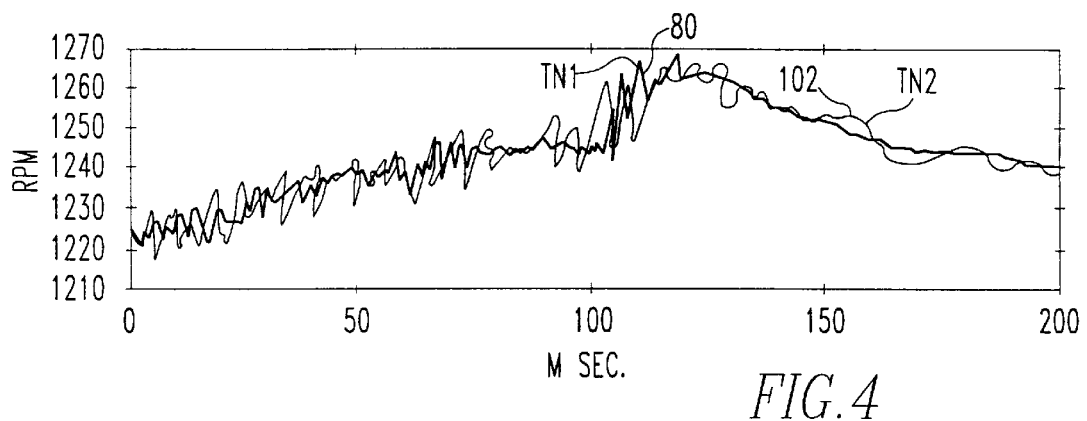
FIG. 4 is a graphical illustration of tachometer signals output by tachometers T1 and T2 measuring the rotational velocity of motors M1 and M2 being driven from X converter X-CNV having one non-operational power switching device.

With reference to FIG. 4, if, however, the X converter 4 has a faulty gate driver board or a faulty power switching device, the three-phase sinusoidal waveform is not produced and power is non-uniformly delivered to the motor 10. This non-uniform delivery of power to motor 10 results in irregular delivery of power to the wheels W associated therewith. This irregular delivery of power to the wheels W is manifested as undesired vibration of the vehicle V and is particularly noticeable during acceleration and at speeds below 30 miles per hour. In response to the irregular delivery of power to the wheels W, the tachometer 18 outputs a tachometer signal TN1 80 that includes noise components which are typically not present when the converter is operating properly.

Figure 5:
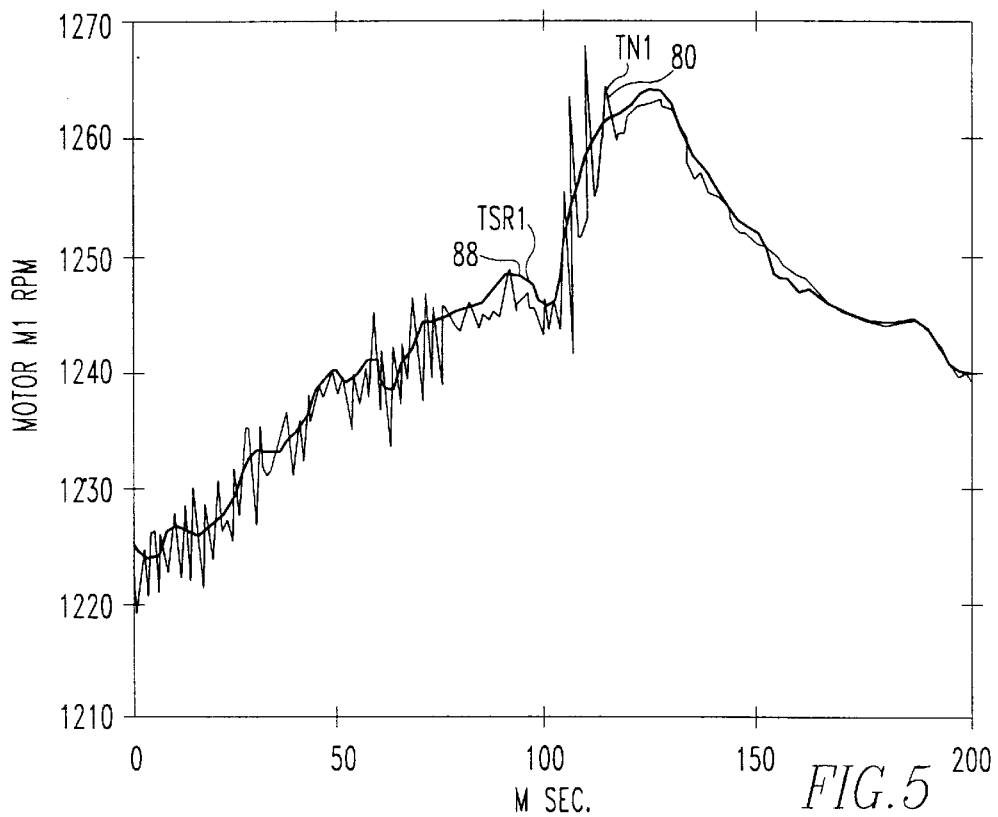
FIG. 5 is a graphical illustration of tachometer signal TN1 of FIG. 4 shown on an enlarged scale and including a reference tachometer signal TSR1.

With reference to FIG. 5 and with continuing reference to FIG. 2, the tachometer signal 78 or 80 is supplied to the vibration detect circuit 28. Because the vibration detect circuits 28–34 are similar, only the operation of the vibration detect circuits 28 and 30 will be described herein. The vibration detect circuit 28 includes, in order, a low pass filter F1 82, a summing or combiner circuit S1 84, and a signal processing circuit SPC1 86.

The low pass filter 82 low pass filters the tachometer signal 78 or 80 and outputs a low pass filtered or reference tachometer signal TSR1 88 to the summing circuit 84. Preferably, the reference tachometer signal 88 is similar to the tachometer signal 78 regardless of the tachometer signal 78 or 80 input into the low pass filter 82.

Figure 6:
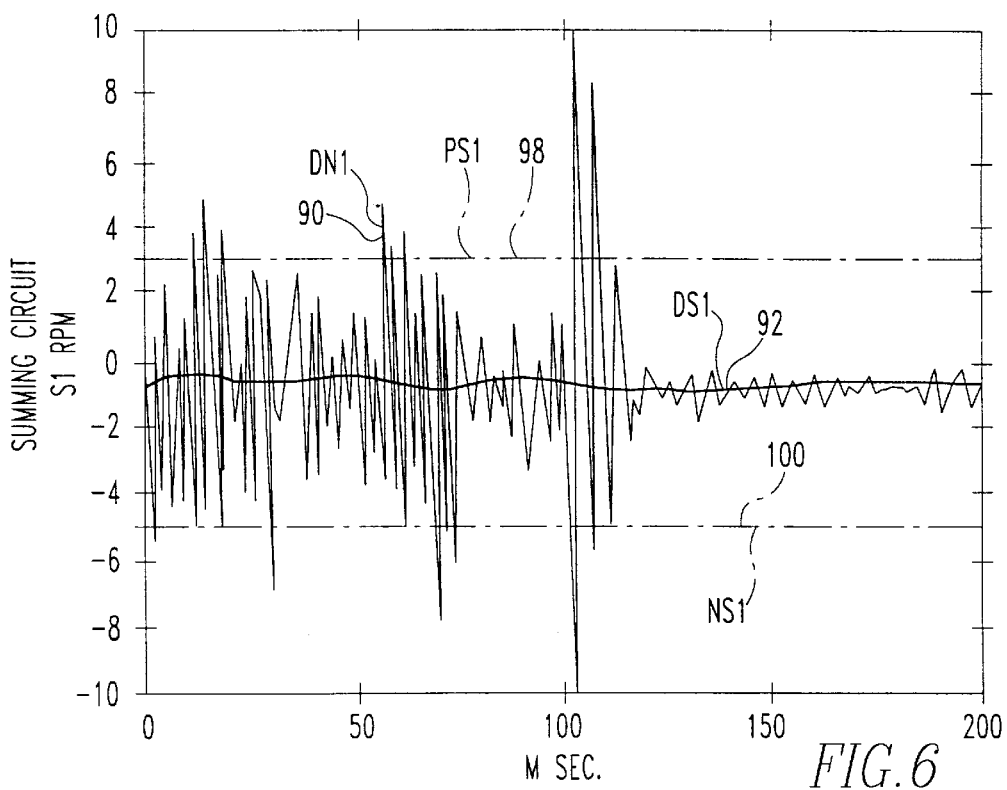
FIG. 6 is a graphical illustration of an output of summing circuit S1 in FIG. 2 in response to the input of a tachometer signal in response to motor M1 being driven by X converter X-CNV having one non-operational power switching device and an output of the summing circuit S1 in response to the input of a tachometer signal in response to motor M1 being driven by the X converter X-CNV having all its power switching devices operational.

With reference to FIG. 6 and with continuing reference to FIGS. 2 and 5, the summing circuit 84 combines the reference tachometer signal 88 and the tachometer signal 78 or 80 and outputs a deviation signal which represents a detected deviation therebetween. If the tachometer signal 80 containing excessive noise is provided to the summing circuit 84 and the low pass filter 82, the signal output by the summing circuit 84 will be a deviation signal DN1 90 representative of the noise components in the tachometer signal 80 centered at or near zero rpms. If, however, the tachometer 18 outputs the substantially noise free tachometer signal 78 to the summing circuit 84 and the low pass filter 82, the signal output by the summing circuit 84 will be a substantially noise free deviation signal DS1 92 centered at or near zero rpms. As shown in FIG. 6, the noise components in tachometer signal 80 cause the deviation signal 90 to have greater amplitude and frequency variations than the deviation signal 92.

The output of the summing circuit 84 is provided to signal processing circuit SPC1 86 which outputs a comparator signal which is functionally related to the deviation signal 90–92. The signal processing circuit 86 includes a comparator C1 94 and a reference value generator RV1 96. The reference value generator 96 supplies a positive reference value PS1 98 and a negative reference value NS1 100 to the comparator 94. The comparator 94 compares the deviation signal 90 output by the summing circuit 84 to the positive reference value 98 and the negative reference value 100. The comparator 94 outputs a binary signal in response to the comparison of the deviation signal, i.e., 90, to the positive reference value 98 and the negative reference value 100. More specifically, when the deviation signal 90 is greater than the positive reference value 98 or less than the negative reference value 100, the comparator 94 outputs a binary signal of 1. Moreover, when the deviation signal 90 is between the positive reference value 98 and the negative reference value 100, the comparator 94 outputs a binary signal of 0.

The value of the positive reference 98 and the value of the negative reference 100 will determine the number of binary 1 signals output by comparator 94 during a given interval of the signal 90. For example, for an input of the signal 90 in FIG. 6, in response to the selection of a positive reference value 98 corresponding to 4 rpm, the comparator 94 outputs two binary 1 signals between 0–100 msec. Similarly, in response to the selection of a negative reference value 100 corresponding to –4 rpm, the comparator 94 outputs about fourteen binary 1 signals between 0–100 msec. Hence, the comparator 94 outputs sixteen binary 1 signals between 0–100 msec. Moreover, when the output of the summing circuit 84 is between ±4 rpm the comparator 94 outputs a binary 0 signal.

The reference tachometer signal 88 is phase shifted relative to the tachometer signal 78 or 80. This phase shift is caused by the operation of the low pass filter 82 on the tachometer signal 78 or 80. As shown in FIG. 6, this phase shift causes the average deviation signal output by the summing circuit 84 to be amplitude shifted, e.g., about −1 rpm, relative to the 0 rpm axis. To compensate for this amplitude shift, the positive reference value 98 and the negative reference value 100 are adjusted an amount corresponding to the average offset from the 0 rpm axis. Thus, in FIG. 6, the positive reference value 98 and negative reference value 100 are each shifted by −1 rpm to 3 rpm and −5 rpm, respectively. In this manner, the comparator 94 is adjusted to detect values of signal 90 occurring a common ± value to either side of the average deviation signal.

The output of the comparator 94 is provided to the controller 8. The controller 8 includes software to accumulate in a first counter a count of the binary 1 signals generated by the comparator 94 over a preselected interval of time TI, e.g., one second. The controller 8 compares the accumulated count to a first number, e.g., 25. If the accumulated count is greater than the first number, the controller 8 terminates supplying control signals to the X converter 4 which responds by terminating the supply of power to motor 10, and consequently motor 12. In this manner, the controller 8 controls the supply of switched DC power delivered or provided to motors 10 and 12 as a function of the accumulated count. In the absence of motors 10 and 12 providing motive force to the wheels W associated therewith, motive force is provided to the vehicle V by the controller 8 causing the Y converter 6 to switchably provide power to motors 14 and 16 which, in turn, provide motive force to wheels W associated therewith. In this manner vehicle V remains operational in the absence of undesirable vibration, albeit at a reduced performance level.

Figure 7:
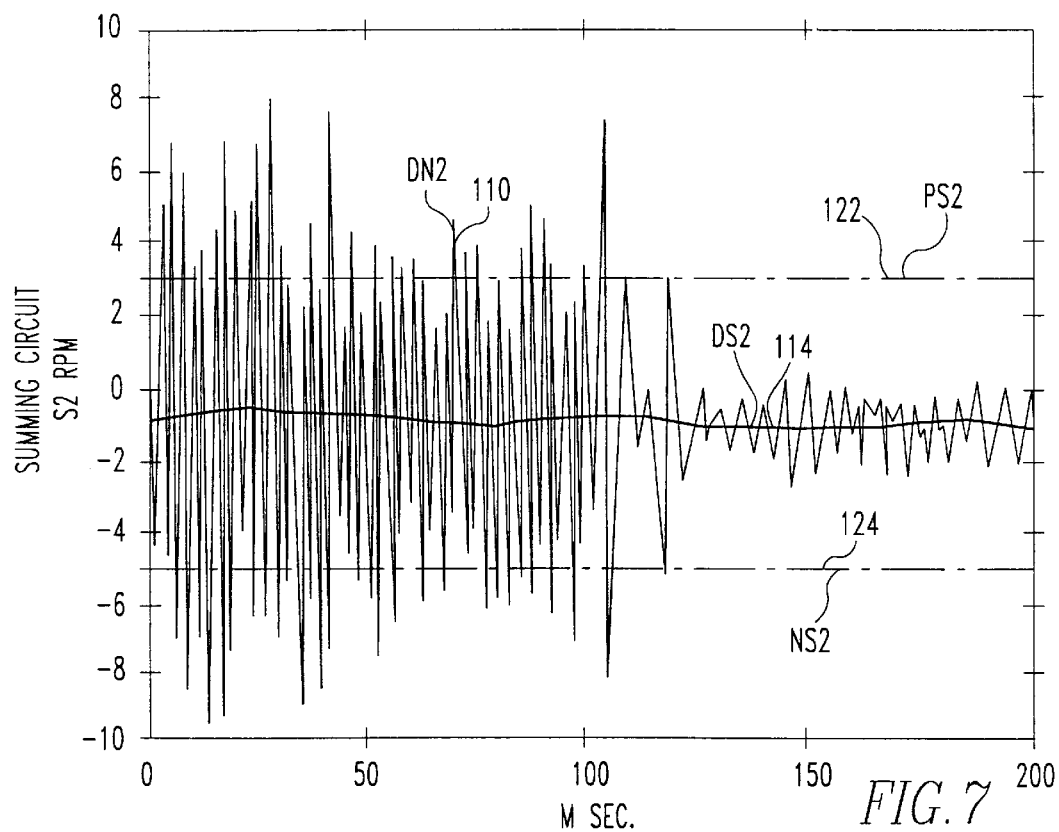
FIG. 7 is a graphical illustration of an output of summing circuit S2 in response to the input of a tachometer signal in response to motor M2 being driven by X converter X-CNV having a non-operational power switching device and an output of the summing circuit S2 in response to the input of a tachometer signal in response to motor M2 being driven by the X converter X-CNV having all of its power switching devices operational.

With reference to FIG. 7 and with continuing reference to FIGS. 2–4, in the presence of a faulty gate driver board, e.g., 36, or a faulty power switching device, e.g., 48, the X converter 4 also delivers power non-uniformly to motor 12. As with motor 10, this non-uniform power delivery results in the motor 12 irregularly delivering power to the wheels W associated therewith. In response to this irregular delivery of power to the wheels W, the tachometer 20 outputs a tachometer signal TN2 102 that includes excessive noise components which are typically not present when the X converter 4 is operating properly. The tachometer signal 102 is provided to summing circuit S2 104 and low pass filter F2 106. The low pass filter 106 low pass filters the tachometer signal 102 and outputs a low pass filtered or reference tachometer signal TSR2 (not shown) to the summing circuit 104. The summing circuit 104 combines the reference tachometer signal TSR2 and the tachometer signal 102 to produce a deviation signal DN2 110 representative of the noise components in the tachometer signal 102 centered at or near zero rpms. If a substantially noise free tachometer signal TS2 112 is output by tachometer 20, the summing circuit 104 will output a substantially noise free deviation signal DS2 114 centered at or near zero rpms.

The output of the summing circuit 104 is provided to a signal processing circuit SPC2 116 which includes a comparator C2 118 and a reference value generator RV2 120. The signal processing circuit 116 operates in the same manner as the signal processing circuit 86. Specifically, the reference value generator 120 supplies a positive reference value PS2 122 and negative reference value NS2 124 to the comparator 118. Alternatively, the positive reference value 98 and the negative reference value 100 are supplied to comparator 118 by reference value generator 96. Like comparator 94, comparator 118 outputs a binary 1 signal when the deviation signal 110 is greater than the positive reference value 122 or less than the negative reference value 124. Moreover, the comparator 118 outputs a binary 0 signal when the deviation signal 110 is between the positive reference value 122 and the negative reference value 124. The controller 8 accumulates a count of the non-zero binary signals output by the comparator 118 over the preselected interval of time TI and terminates the supply of control signals to the X converter 4 if the count exceeds the first number. Thus, the controller 8 can terminate the supply of electrical energy from the X converter 4 if either tachometer signal 80 or tachometer signal 102 contain excess levels of noise. Alternatively, the controller 8 can require that both tachometer signals 80 and 102 contain excessive levels of noise before terminating the control signal to the X converter 4 and, hence, the supply of switched electrical power to motors 10 and 12.

In another embodiment, the controller 8 maintains a second counter which accumulates a count each time the controller 8 counts more than the predetermined number of non-zero outputs during the preselected interval of time TI. When the accumulated count in the second counter is greater than a preselected value, e.g., 3, the controller 8 terminates the control signals to the X converter 4.

Figure 8:
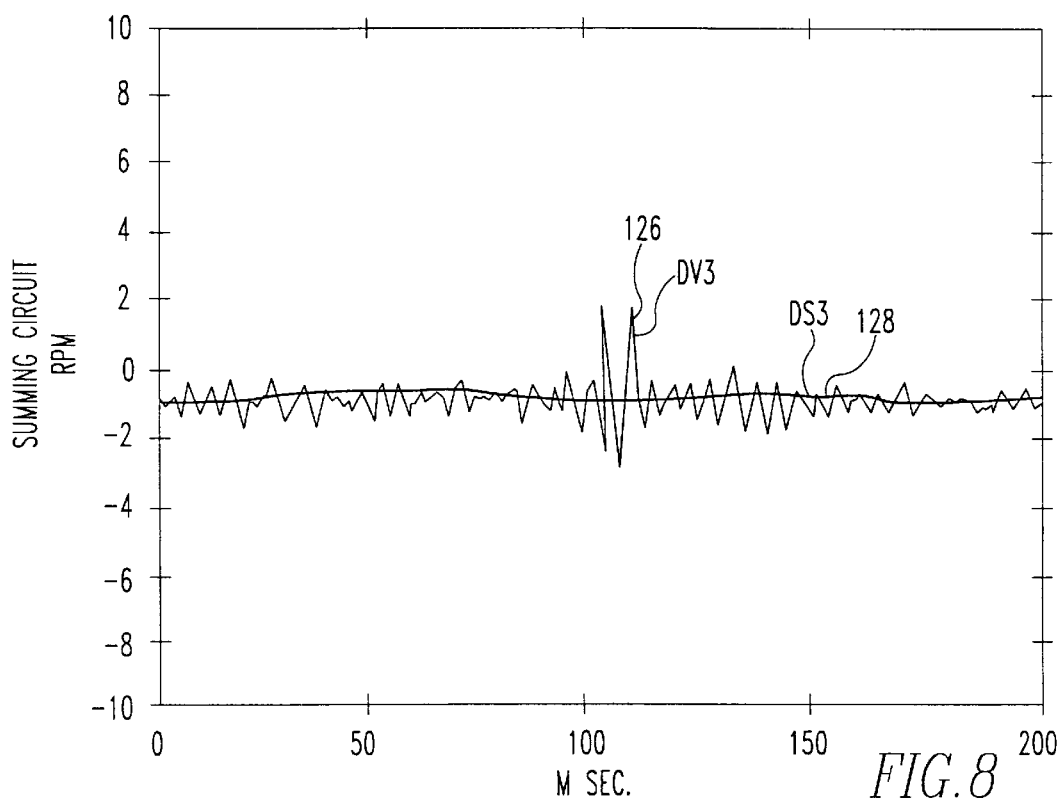
FIG. 8 is a graphical illustration of the output of a summing circuit of a vibration detect circuit VD3 in FIG. 2 in response to the input of a tachometer signal in response to motor M3 being driven by Y converter Y-CNV having all of its switching devices operational.

With reference to FIG. 8 and with continuing reference to FIG. 1, vibration of vehicle V caused by a faulty gate driver board or a faulty power switching device in the X converter 4 is observable, inter alia, in the output signals of summing circuits (not shown) of vibration detect circuits 32 and 34, respectively. For example, tachometer 22 experiences vibration of the vehicle V caused by the non-uniform power delivery to motors 10 and 12 by the X converter 4. The tachometer 22 superimposes this vibration onto the output signals thereof. In the presence of properly operating Y converter 6, the summing circuit of the vibration detect circuit 32 outputs a deviation signal DV3 126 that includes vibration components caused by the vibration of the vehicle V due to improperly operating X converter 4. In the presence of properly operating converters 4 and 6, the summing circuit of the vibration detect circuit 32 outputs a substantially noise free signal 128 centered at or near zero rpms.

Figure 9:
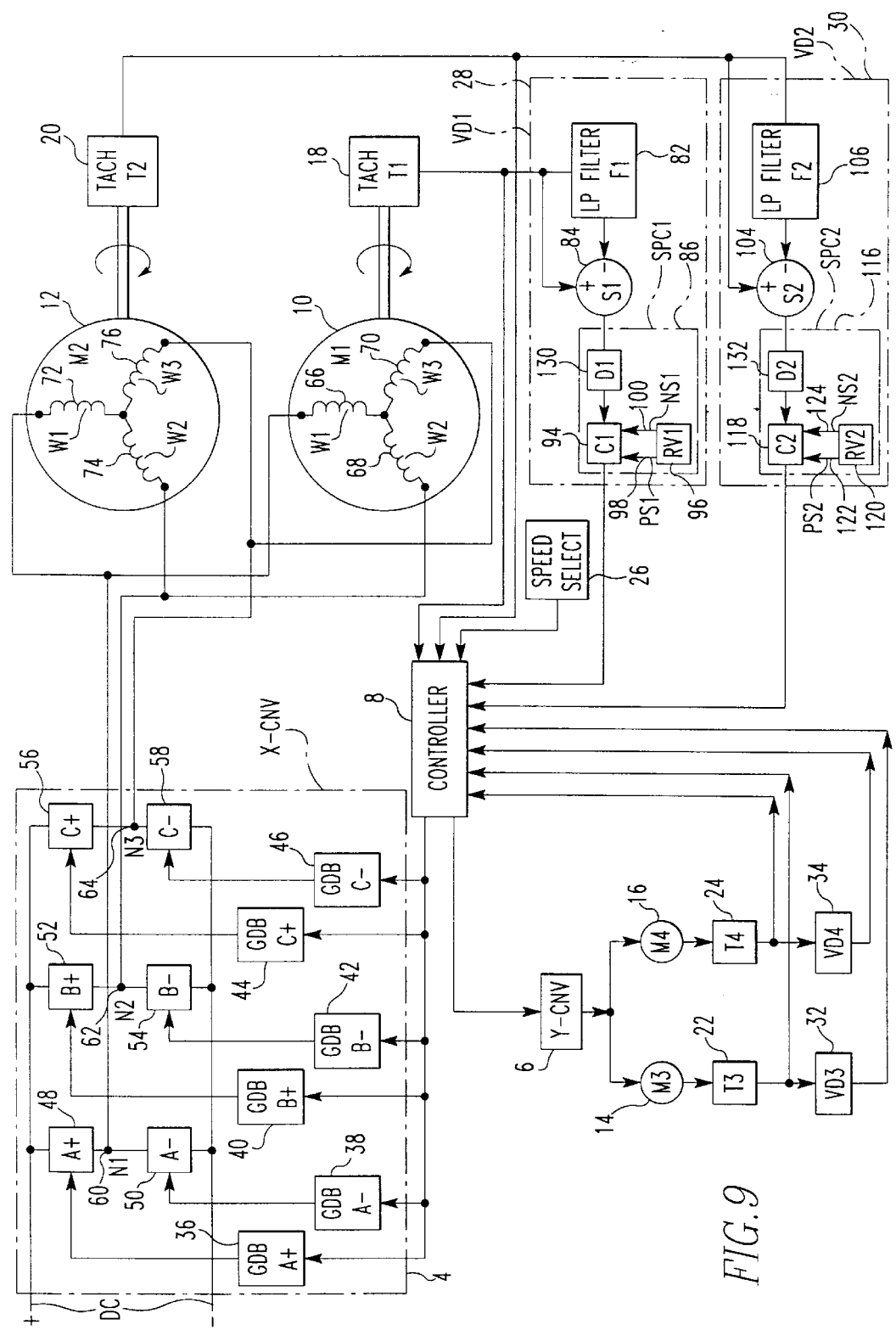
FIG. 9 is a diagramatic illustration of the circuitry shown in FIG. 2 including a differentiator as part of the circuitry for detecting vibration.

With reference to FIG. 9, in another embodiment the signal processing circuit 86 includes a differentiator D1 130 positioned to receive the deviation signal 92 or 90 output by the summing circuit 84. Similarly, the signal processing circuit 116 includes a differentiator D2 132 positioned to receive the deviation signal 114 or 110 output by the summing circuit 104. The differentiators 130 and 132 differentiate the deviation signals output by summing circuits 84 and 104 and provide differentiated deviation signals to comparators 94 and 118, respectively. Differentiating the deviation signals removes any shift in the amplitude of the signals introduced by low pass filters 82 and 106. Hence, the differentiated deviation signals provided to comparators 94 and 118 are signals stripped of any amplitude shift caused by low pass filters 82 and 106. Accordingly, the positive reference values 98 and 122 and the negative reference values 100 and 124 output by the reference value generators 96 and 120 can be set to a common ± value on opposite sides of the average deviation signal. Preferably, the differentiators 130 and 132 differentiate deviation signals 92 or 90 and 114 or 110, respectively, by taking a difference between a previous or first reading of the deviation signal and a present or second reading. The difference between the present and previous deviation signals is divided by an interval between the present reading and the previous reading to obtain a value proportional to the deviation signals absent any offset caused by the low pass filters 82 and 106 i.e., the differentiated deviation signals.

As can be seen from the foregoing, the present invention enables vibration in a vehicle caused by the non-operation of power switching device to be detected in the output signal of a tachometer by measuring the rotational velocity of the motor. Moreover, the operation of the inverter with a non-operating power switching device can be controlled as a function of the detected vibration.

The invention has been described with reference to the preferred embodiments. Obvious modifications and alterations will occur to others upon reading and understanding the preceding detailed description. It is intended that the invention be construed as including all such modifications and alterations insofar as they come into the scope of the appended claims and the equivalents thereof.

I claim:

1. A method of reducing vibration in a vehicle having wheels coupled to a motor powerable from a source of switched DC power, the method comprising the steps of:

supplying switched DC power to a motor coupled to wheels of a vehicle to provide motive force thereto;

producing a tachometer signal indicative of the rotational velocity of the motor;

detecting deviations between the tachometer signal and a reference tachometer signal;

generating an output signal that changes binary state as a function of the detected deviations;

accumulating in a first counter over a preselected interval a count of one of the binary states of the output signal; and controlling the supply of switched DC power to the motor as a function of the accumulated count.

2. The method as set forth in claim 1, further including the step of low pass filtering the tachometer signal to obtain the reference tachometer signal.

3. The method as set forth in claim 1, further including the step of comparing the detected deviations to a reference value, wherein:

the output is in one of the binary states when a detected deviation is greater than the reference value; and the output signal is in the other of the binary states when the detected deviation is less than the reference value.

4. The method as set forth in claim 1, further including the step of:

comparing the detected deviations to a positive value and a negative value, wherein:

the output signal is in one of the binary states when the detected deviation is between the positive value and the negative value; and the output signal is in the other of the binary states when the detected deviation is one of greater than the positive value and less than the negative value.

5. The method as set forth in claim 1, wherein the step of generating an output signal includes the steps of:

differentiating the detected deviations;

comparing the differentiated deviations to a value; and generating an output signal as a function of the differentiated deviations.

6. The method as set forth in claim 5, wherein the step of differentiating includes determining a difference between a present detected deviation and a previous detected deviation.

7. The method as set forth in claim 1, further including the steps of:

incrementing a second counter when the accumulated count in the first counter is greater than a first number; and comparing the value of the second counter to a second number, wherein the supply of switched DC power to the motor is terminated when the value of the second counter is greater than the second number.

8. A method for detecting vibration in a vehicle powered by a traction system comprised of a motor driver circuit which controllably supplies switched DC power to a motor, the method comprising the steps of:

providing switched DC power to the motor;

detecting the rotational velocity of the motor;

producing a tachometer signal indicative of the rotational velocity;

generating a reference tachometer signal;

determining a deviation between the tachometer signal and the reference tachometer signal;

comparing the deviation to a reference value;

accumulating a count as a function of the comparison; and controlling the provisioning of switched DC power to the motor as a function of the accumulated count.

9. The method as set forth in claim 8, wherein the step of comparing the deviation includes the steps of:

differentiating the deviation; and comparing the differentiated deviation to the reference value.

10. The method as set forth in claim 9, wherein the step of differentiating the deviation includes the steps of:

determining a first difference between the tachometer signal and the reference tachometer signal;

determining a second difference between the tachometer signal and the reference tachometer signal; and determining a third difference between the first difference and the second difference, wherein the third difference is proportional to the differentiated deviation.

11. The method as set forth in claim 10, wherein the step of differentiating the deviation includes the further step of dividing the third difference by an interval between the determination of the first difference and the determination of the second difference.

12. The method as set forth in claim 8, wherein the step of controlling includes the steps of:

comparing the accumulated count to a first number; and terminating the provisioning of switched DC power to the motor if the accumulated count is greater than the first number.

13. The method as set forth in claim 8, wherein the step of controlling includes the steps of:

comparing the accumulated count to a first number;

incrementing a second counter when the accumulated count is greater than the first number;

comparing the value of the second counter to a second number; and terminating the provisioning of switched DC power to the motor if the accumulated value of the second counter is greater than the second number.

14. The method as set forth in claim 8, wherein the controlling step is also a function of an interval over which the count is accumulated.

15. An apparatus for detecting vibration in a vehicle, the vehicle having a controller which controls a motor drive circuit to controllably deliver switched DC power to a motor, and a tachometer which detects rotational velocity of the motor and outputs a tachometer signal indicative thereof, said apparatus comprising:

a filter which filters the tachometer signal and which outputs a reference tachometer signal;

a combiner which combines the tachometer signal and the reference tachometer signal and which outputs a deviation signal; and a signal processing circuit which outputs a comparator signal which is functionally related to the deviation signal, wherein:

the controller accumulates in a first counter a count of comparator signals having a value that is one of greater than and less than a first value and which causes the motor drive circuit to control the provisioning of power to the motor as a function of the accumulated count.

16. The apparatus as set forth in claim 15, wherein the signal processing circuit includes:

a comparator which compares the deviation signal to a second value and which outputs the comparator signal which is functionally related to the comparison.

17. The apparatus as set forth in claim 15, wherein the signal processing circuit includes:

a differentiator which differentiates the deviation signal and which outputs a differentiated deviation signal; and a comparator which compares the differentiated deviation signal to a second value and which outputs the comparator signal which is functionally related to the comparison.

18. The apparatus as set forth in claim 15, wherein the comparator signal is a binary signal that is in one binary state in response to the deviation signal being greater than the first value and is in the other binary state in response to the deviation signal being less than the first value.

19. The apparatus as set forth in claim 15, wherein the filter is a low pass filter.

20. The apparatus as set forth in claim 15, wherein the controller increments a second counter when the count accumulated in the first counter is greater than a first number, and wherein the controller causes the motor drive circuit to terminate the provisioning of power to the motor when the value of the second counter is greater than a second number.

21. A vehicle comprised of:

a plurality of wheels;

a motor which imparts motive force to the plurality of wheels;

a converter connected between a source of DC power and the motor;

a controller which controls the operation of the converter to deliver switched DC power to the motor;

a tachometer which measures the rotational velocity of the motor and which outputs a tachometer signal related thereto;

a filter which filters the tachometer signal and which outputs a reference tachometer signal;

a combiner which combines the tachometer signal and the reference tachometer signal and which outputs a deviation signal related thereto; and a signal processing circuit which outputs a comparator signal that changes binary state as a function of the deviation signal, wherein:

the controller accumulates in a first counter over a select interval a count of one of the binary states of the comparator signal, and wherein the controller causes the convertor to terminate delivering switched DC power to the motor as a function of the accumulated count.

22. The vehicle as set forth in claim 21, wherein the signal processing circuit includes:

a differentiator which differentiates the deviation signal and which provides a differentiated deviation signal; and a comparator which compares the differentiated deviation signal to a first value and which outputs the comparator signal in one of the binary states as a function of the comparison.

23. The vehicle as set forth in claim 21, wherein the signal processing circuit includes:

a comparator which compares the deviation signal to a first value and which outputs the comparator signal in one of the binary states as a function of the comparison.

* * * * *